(12) United States Patent
Ring et al.

(10) Patent No.: US 6,474,450 B1
(45) Date of Patent: Nov. 5, 2002

(54) MECHANICAL SENSOR FOR A QUICK RELEASE HAND BRAKE

(75) Inventors: Michael E. Ring, Crown Point, IN (US); David C. Brabb, Chicago, IL (US)

(73) Assignee: Westinghouse Air Brake Technologies, Wilmerding, PA (US)

( * ) Notice: Subject to any disclaimer, the term of this patent is extended or adjusted under 35 U.S.C. 154(b) by 0 days.

(21) Appl. No.: 09/874,449

(22) Filed: Jun. 5, 2001

(51) Int. Cl.[7] ............................................. F16D 66/00
(52) U.S. Cl. ..................... 188/1.11 R; 188/33; 188/107
(58) Field of Search ............................. 188/1.11 R, 33, 188/107; 116/58 A; 74/505

(56) References Cited

U.S. PATENT DOCUMENTS

| | | | |
|---|---|---|---|
| 3,854,417 A | * 12/1974 | MacDonnell et al. | .... 105/463.1 |
| 4,368,648 A | * 1/1983 | Housman et al. | ............. 74/505 |
| 6,170,619 B1 | * 1/2001 | Sheriff et al. | ............... 188/107 |
| 6,237,722 B1 | * 5/2001 | Hammond et al. | .... 188/1.11 R |
| 6,364,069 B1 | * 4/2002 | Ring | ..................... 188/1.11 R |
| 6,364,428 B1 | * 4/2002 | Labriola et al. | ............... 188/33 |
| 6,394,233 B1 | * 5/2002 | Kanjo et al. | ........... 188/1.11 R |
| 6,397,978 B1 | * 6/2002 | Jackson et al. | ............... 188/33 |

* cited by examiner

*Primary Examiner*—Jack Lavinder
*Assistant Examiner*—Mariano Sy
(74) *Attorney, Agent, or Firm*—James Ray & Associate

(57) ABSTRACT

A mechanical sensor for a hand brake quick release mechanism having a housing, flexible clamp, and release shaft having a member with first and second elements. A housing member has open and closed ends. The open end is engageable with a housing outside wall at a point radially opposed to the flexible clamp. A first aperture formed through the closed end is in axial alignment with a second aperture through the housing wall and a third aperture through the flexible clamp. A first portion of the slidable member is disposed within the housing member. A second portion extends through the first aperture, and a portion of the first portion extends through the second and third apertures, engaging with the first element when the release shaft is rotated to achieve and maintain full brake release. A device is provided for urging the slidable member inwardly when the hand brake is applied.

20 Claims, 5 Drawing Sheets

MECHANICAL SENSOR FOR A QUICK RELEASE HAND BRAKE

CROSS-REFERENCE TO RELATED APPLICATION

The invention taught in the present application is closely related to the inventions taught in patent applications titled "Apparatus For A Quick Release Mechanism In A Railcar Hand Brake", having Ser. No. 09/664,212, filed on Sep. 18, 2000, now U.S. Pat. No. 6,364,428 and "Electronic Sensor For A Quick Release Hand Brake" filed concurrently herewith and having Ser. No. 09/876,337 filed on Jun. 7, 2001, now U.S. Pat. No. 6,364,069.

These applications are assigned to the assignee of the present application. The teachings of these co-pending patent applications are incorporated herein by reference thereto.

FIELD OF THE INVENTION

The present invention relates, in general, to a mechanical sensor for a quick release mechanism for a railroad car vertical hand brake, and more particularly, to a mechanical sensor that provides a visual signal that the hand brake is in the released position.

BACKGROUND OF THE INVENTION

Prior to the present invention, a railroad car vertical hand brake includes a brake release mechanism that provides free release of the brakes by disengaging the winding gear to permit free rotation of the main gear wheel. The quick release mechanism maintains a railcar hand brake in the full release position while the train is moving, preventing worn wheels. However, a railroad operator often has to climb onto the railcar to visually determine that the hand brake is released before moving the train. This procedure can be hazardous to the operator, and time-consuming.

SUMMARY OF THE INVENTION

In a first aspect, the present invention provides a mechanical sensor for a quick release mechanism in a railcar vertical hand brake having a housing equipped with a flexible clamp on an inside surface of a wall of the housing, and a release shaft having a member disposed perpendicular to and about a circumference thereof, a first element disposed on the member which interposes with the flexible clamp when the release shaft is rotated to both achieve and maintain a full brake release, and a second element disposed on the member to engage a projection on a ratchet wheel when an operating shaft of the hand brake is rotated to disengage the first element from the flexible clamp to allow a brake application. The mechanical sensor comprises a generally hollow housing member having an open end and a substantially closed radially opposed end. The open end is engageable with an outside surface of a wall of the housing at a point radially opposed to the flexible clamp. A first aperture is formed through the substantially closed radially opposed end of the housing member and in substantially axial alignment with a second aperture formed through the housing wall and a third aperture formed through the flexible clamp. A slidable member has a first portion disposed for reciprocal longitudinal movement within the generally hollow housing member, and a second portion of the slidable member is connected to the first portion. The second portion extends outwardly through the first aperture in the radially opposed end of the housing member. At least a portion of the first portion extends through the second aperture formed through the housing wall, and the third aperture formed through the flexible clamp, for engagement with the first element of the member when the release shaft is rotated to achieve and maintain full brake release. The mechanical sensor includes a means for urging the slidable member into a position wherein a predetermined length of the first portion of the slidable member is retracted through the second aperture formed through the housing wall and the third aperture formed through the flexible clamp, thereby indicating that the hand brake is in an applied position.

OBJECTS OF THE INVENTION

It is therefore a primary object of the present invention to provide a mechanical sensor for a quick release mechanism in a railcar vertical hand brake, which indicates the present condition of the hand brake.

Another object of the present invention is to provide a mechanical sensor for a quick release mechanism in a railcar vertical hand brake having a visual indicator for the railcar operator that can be seen from the ground, to determine that the hand brake has been fully released without having to climb onto the railcar.

Still a further object of the present invention is to provide a mechanical sensor for a quick release mechanism in a railcar vertical hand brake, which will reduce potential injury to a railcar operator by minimizing the need to climb onto a railcar to determine if the hand brake is released.

In addition to the various objects of the invention that have been described above, various other objects and advantages of the invention will become readily apparent to those persons skilled in the relevant art from the following more detailed description of the invention, particularly, when such description is taken in conjunction with the attached drawing figures and the appended claims.

Figure 1:
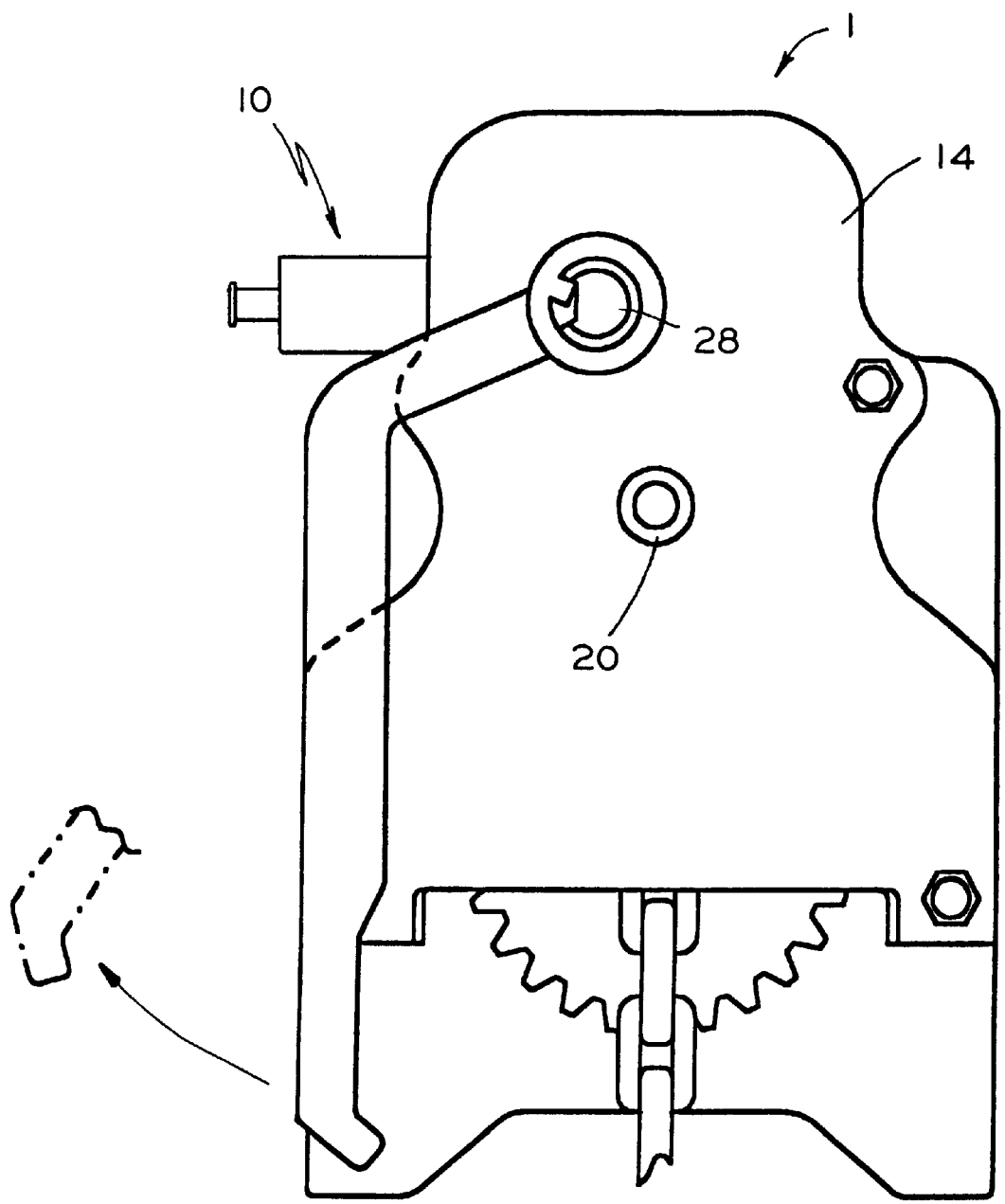
FIG. 1 is a front elevational view of a railcar vertical hand brake of the present invention.
Figure 2:
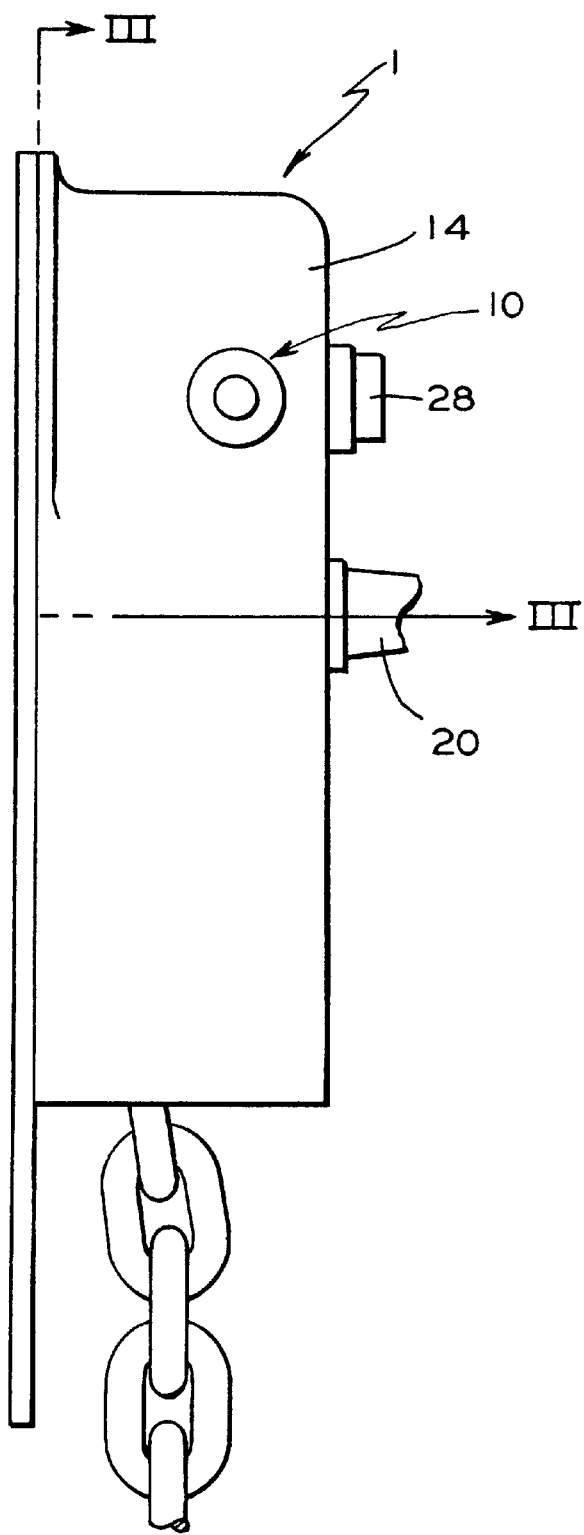
FIG. 2 is a side elevational view of a railcar vertical hand brake of the present invention.
Figure 3:
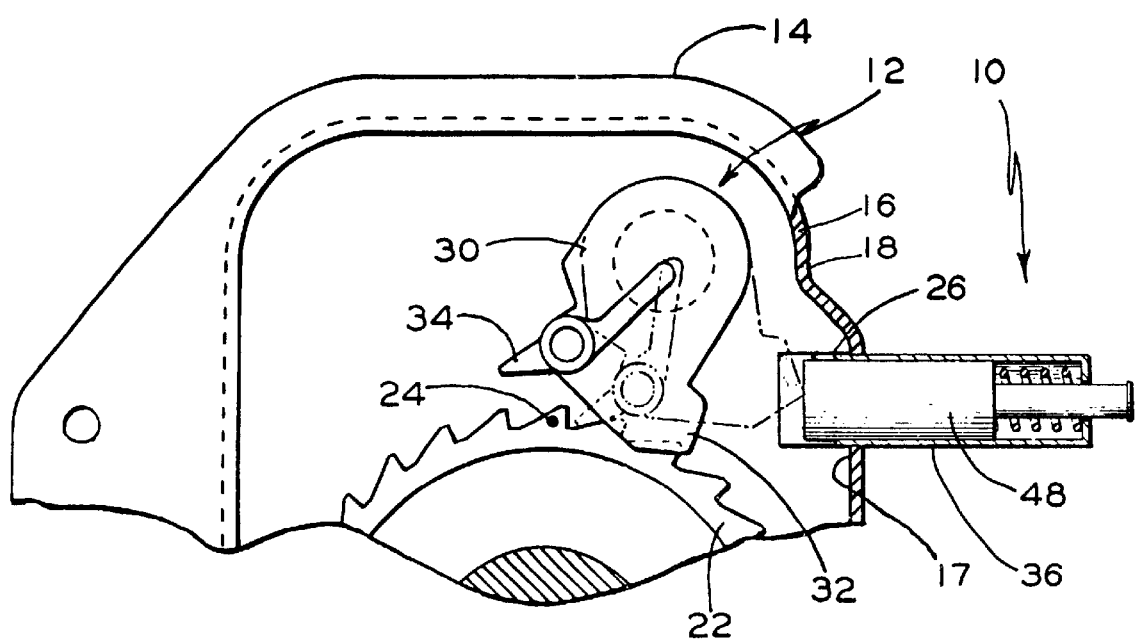
FIG. 3 is a front sectional view taken along the lines of III—III of FIG. 2.

BRIEF DESCRIPTION OF A PRESENTLY PREFERRED AND VARIOUS ALTERNATIVE EMBODIMENTS OF THE PRESENT INVENTION

Prior to proceeding to a more detailed description of the invention, it should be noted that identical components having identical functions have been clearly designated with identical reference numerals for the sake of clarity.

Now refer to FIGS. 1, 2, 3, 4, and 5 of the drawings. Illustrated therein is a mechanical sensor, generally designated 10, for a quick release mechanism, generally designed 12, for a railcar hand brake, generally designated 1, having a housing 14 equipped with a flexible clamp 26 mounted on an inside surface 17 of a wall 16 of the housing 14. A release shaft 28 has a member 30 disposed perpendicular to and about the circumference of the release shaft 28. A first element 32 is disposed on the member 30, which interposes with the flexible clamp 26 when the release shaft 28 is rotated to both achieve and maintain a full brake release. A second element 34 is disposed on the member 30 to engage a projection 24 on a ratchet wheel 22 when an operating shaft 20 of the hand brake 1 is rotated to disengage the first element 32 from the flexible clamp 26 to allow for brake application.

Figure 4:
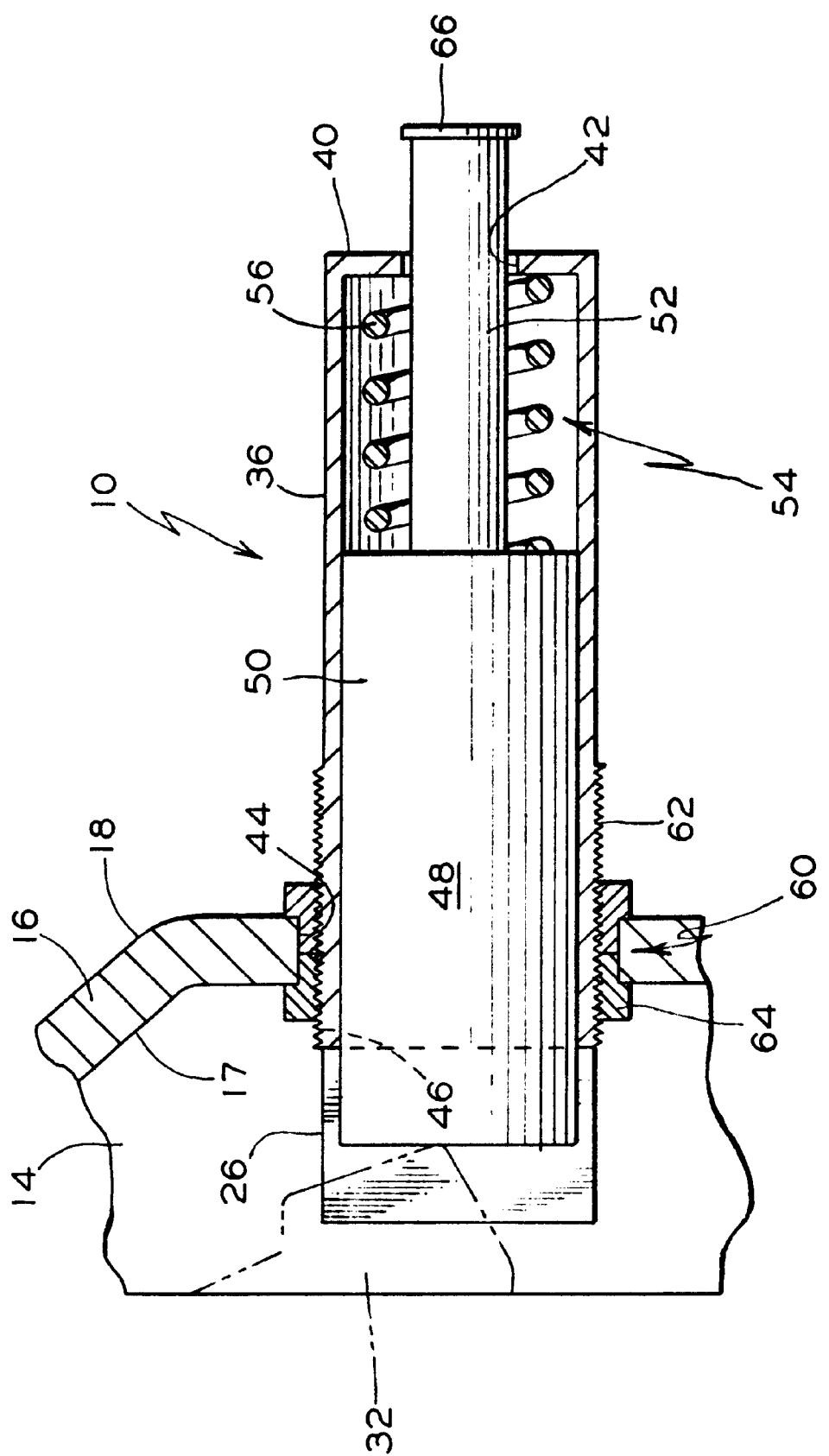
FIG. 4 is a detailed view of a section taken from the front sectional view of FIG. 3.
Figure 5:
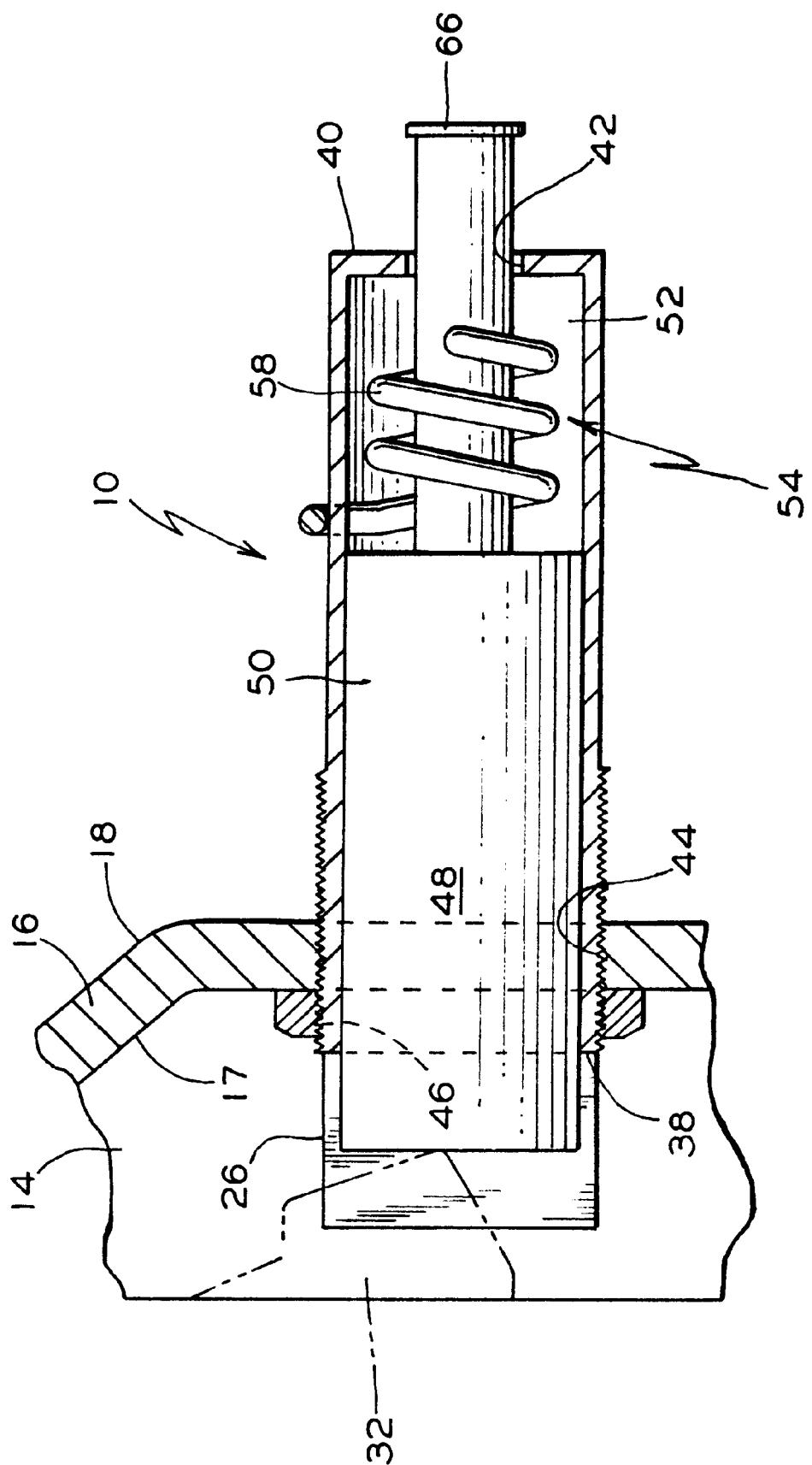
FIG. 5 is a detailed view of a section taken from the front sectional view of FIG. 3 illustrating an alternative embodiment of the present invention.

The mechanical sensor 10 comprises a generally hollow housing member 36, having an open end 38, and a substantially closed radially opposed end 40. The open end 38 is engageable with an outside wall 18 of the housing 14 at a point radially opposed to the flexible clamp 26. Preferably, the housing member 36 is a case, with an elongated cylindrical shape. It is also preferred that the material of the housing member 36 is metal. A first aperture 42 is formed through the substantially closed radially opposed end 40 of the housing member 36, and is in substantially axial alignment with a second aperture 44 formed through the wall of the housing 14, and a third aperture 46 formed through the flexible clamp 26. Preferably, the first aperture 42 is substantially round. A first portion 50 of the slidable member 48 is disposed for reciprocal longitudinal movement within the generally hollow housing member 36. A second portion 52 of the slidable member 48 is connected to the first portion 50, and extends outwardly through the first aperture 42 in the radially opposed end 40 of the housing member 36. At least a portion of the first portion 50 extends through the second aperture 44 formed through the wall of the housing 14, and the third aperture 46 formed through the flexible clamp 26, for engagement with the first element 32 of the member 30 when the release shaft 28 is rotated to achieve and maintain full brake release. Preferably, the first portion 50 and the second portion 52 of the slidable member 48 have a predetermined size, shape, and material. The preferred material is metal, and the preferred shape is substantially cylindrical. Preferably, the diameter of the first portion 50 is substantially larger than the diameter of the second portion 52, and the diameter of the second portion 52 is smaller than the diameter of the first aperture 42. A means, generally designated 54, is provided for urging the slidable member 48 into a position wherein a predetermined length of the first portion 50 of the slidable member 48 is retracted through the second aperture 44 formed through the wall of the housing 14, and the third aperture 46 formed through the flexible clamp 26. Preferably, the means 54 is a helical spring 56 of a predetermined length and load rating. The spring can be in compression or tension. Preferably, the spring 56 is in compression. However, it is obvious from FIG. 5 that a tension spring 58, suitably attached to the housing member 36 and the slidable member 48 can also be used to urge the slidable member 48 into position. It is also preferred that the spring is made of metal, and that the metal is steel. An attachment means, generally designated 60, is provided for securing the housing member 36 on the outside surface 18 of the wall 16 of the housing 14. The attachment means 60 can be at least one of welding, bolting, threading and screwing the housing member 36 into the second aperture 44 which has been threaded, and inserting a threaded portion 62 of the housing member 36 a predetermined distance through the second aperture 44, or fixing the housing member 36 with at least one of a threaded fastener 64 disposed on the threaded portion 62 of the housing member 36. FIG. 4 illustrates the preferred means of securing the housing member 36 by inserting a threaded portion 62 of the housing member 36 a predetermined distance through the second aperture 44, and fixing the housing member 36 with two threaded fasteners 64 disposed on the threaded portion 62 of the housing member 36, opposing each other on the inside surface 17 of the wall 16 and the outside surface 18 of the wall 16 of the housing 14.

Preferably, a means 66 to prevent the slidable member 48 from traversing through the second aperture 44 of the housing 14 and the third aperture 46 of the flexible clamp 26 when the first element 32 is disengaged from the flexible clamp 26 is provided. Preferably, the means 66 is at least one of a washer, pin, and flange disposed on the end of the second portion 52 of the slidable member 48.

OPERATION

When full brake release is desired throughout train movement, the release shaft 28 is rotated. The first element 32 interposes with the flexible clamp 26, whereby the flexible clamp 26 secures the first element 32. The first portion 50 of the slidable member 48 protrudes through the open end 38 of the housing member 36, the second aperture 44 of the housing 14, and the third aperture 46 of the flexible clamp 26. The first element 32 engages with the first portion 50 of the slidable member 48. This engagement displaces the slidable member 48 a predetermined distance through the housing member 36, causing the second portion 52 of the slidable member 48 to protrude through the first aperture 42 of the housing member 36. The protrusion of this second portion 52 is a visual indication that the hand brake is in the fully released position.

When brake application is desired, the operating shaft 20 is rotated in such a direction to move the projection 24 on the ratchet wheel 22 into engagement with the second element 34. This movement disengages the first element 32 from the flexible clamp 26, allowing the means 56 for urging the slidable member 48 to retract the second portion 52 of the slidable member 48 through the first aperture 42. The retraction of the second portion 52 of the slidable member 48 into the housing member 36 is a visual indication that the hand brake is in the brake application position.

Although the invention has been shown in connection with a certain specific embodiment, it will be readily apparent to those skilled in the art that various changes in form and arrangement of parts and method may be made to suit requirements without departing from the spirit and scope of the invention.

We claim:

1. A mechanical sensor for a quick release mechanism in a railcar vertical hand brake, such hand brake having a housing equipped with a flexible clamp mounted on an inside surface of a wall of such housing and a release shaft, such release shaft having a member disposed perpendicular to and about a circumference thereof, a first element is disposed on such member which interposes with such flexible clamp when such release shaft is rotated to both achieve and maintain a full brake release and a second element is disposed on such member to engage a projection on a ratchet wheel when an operating shaft of such hand brake is rotated to disengage such first element from such flexible clamp to allow a brake application, said mechanical sensor comprising:

(a) a generally hollow housing member having an open end and a substantially closed radially opposed end, said open end engageable with an outside surface of such wall of such housing at a point radially opposed to such flexible clamp;

(b) a first aperture formed through said substantially closed radially opposed end of said housing member and in substantially axial alignment with a second aperture formed through such wall and a third aperture formed through such flexible clamp;

(c) a first portion of slidable member disposed for reciprocal longitudinal movement within said generally hollow housing member, a second portion of said slidable member connected to said first portion extends outwardly through such first aperture in said radially opposed end of said housing member and at least a portion of said first portion extends through such second aperture formed through such wall and such third aperture formed through such flexible clamp for engagement with such first element of such member when such release shaft is rotated to achieve and maintain a full brake release; and (d) a means for urging said slidable member into a position wherein a predetermined length of said first portion of said slidable member is retracted through such second aperture formed through such wall and such third aperture formed through such flexible clamp.

2. The mechanical sensor according to claim 1 wherein said housing member is a case.

3. The mechanical sensor according to claim 2 wherein the shape of said case is a cylinder.

4. The mechanical sensor according to claim 3 wherein said cylinder is elongated.

5. The mechanical sensor according to claim 1 wherein the material of said housing member is metal.

6. The mechanical sensor according to claim 1 wherein said first aperture of said housing member is substantially round.

7. The mechanical sensor according to claim 1 wherein a means for securing said housing member on such wall of such housing is at least one of welding, bolting, threading said housing member and screwing into a threaded such second aperture in such housing, and inserting a threaded portion of said housing member a predetermined distance through such second aperture and fixing said housing member with a threaded fastener disposed on said threaded portion of said housing member, said fastener being engaged with such inside wall of such housing.

8. The mechanical sensor according to claim 7 wherein said means for securing said housing member is inserting a threaded portion of said housing member a predetermined distance through such second aperture and fixing said housing member with a threaded fastener disposed on said threaded portion of said housing member, said fastener being engaged with such inside wall of such housing.

9. The mechanical sensor according to claim 1 wherein said first portion and said second portion of said slidable member has a predetermined size, shape, and material.

10. The mechanical sensor according to claim 9 wherein said material of said slidable member metal.

11. The mechanical sensor according to claim 9 wherein said shape of said first portion and said second portion of said slidable member is substantially cylindrical.

12. The mechanical sensor according to claim 11 wherein the diameter of said first portion is substantially larger than the diameter of said second portion.

13. The mechanical sensor according to claim 12 wherein said diameter of said second portion is smaller than the diameter of said first aperture.

14. The mechanical sensor according to claim 1 wherein said means for urging said slidable member is a spring of a predetermined length and load rating.

15. The mechanical sensor according to claim 14 wherein said spring is metal.

16. The mechanical sensor according to claim 15 wherein said metal is steel.

17. The mechanical sensor according to claim 14 wherein said spring is in at least one of compression and tension.

18. The mechanical sensor according to claim 17 wherein said spring is in compression.

19. The mechanical sensor according to claim 18 wherein said spring is helical.

20. The mechanical sensor according to claim 1 wherein a means is provided to prevent said first portion and said second portion of said slidable member from fully traversing through such second aperture of said housing and such third aperture of such flexible clamp when such first element is disengaged from such flexible clamp.

* * * * *